United States Patent [19]

Okumura

[11] Patent Number: 5,255,566
[45] Date of Patent: Oct. 26, 1993

[54] BEARING CONSTRUCTION AND VIBRATION DETECTING APPARATUS

[75] Inventor: Hiromitsu Okumura, Osaka, Japan

[73] Assignee: Denshi Seiki Kogyo Kabushiki Kaisha, Osaka, Japan

[21] Appl. No.: 867,305

[22] Filed: Apr. 10, 1992

[30] Foreign Application Priority Data

Apr. 10, 1991 [JP] Japan ............... 3-106683

[51] Int. Cl.⁵ ................................. G01M 1/22
[52] U.S. Cl. ....................... 73/660; 73/462; 73/475
[58] Field of Search ............ 73/593, 660, , 462, 73/473, 475, 476, 477, 593, 660; 340/682; 384/100, 116, 118

[56] References Cited

U.S. PATENT DOCUMENTS

| | | | |
|---|---|---|---|
| 2,884,282 | 4/1959 | Sixsmith | 384/118 |
| 2,938,756 | 5/1960 | Loeb | 384/118 |
| 3,749,456 | 7/1973 | Whitaker | 384/118 |
| 3,812,627 | 5/1974 | Gebel et al. | 384/100 |
| 4,194,796 | 3/1980 | Svensson et al. | 384/116 |
| 4,671,676 | 6/1987 | Chen et al. | 384/100 |
| 4,941,105 | 7/1990 | Marangoni | 73/660 |

OTHER PUBLICATIONS

A. Clapis et al, "Early diagnosis of dynamic unbalances and of misalignments in large turbogenerators", 1976, pp. 271–277.

*Primary Examiner*—Hezron E. Williams
*Assistant Examiner*—Nashmiya Ashraf
*Attorney, Agent, or Firm*—Edwin E. Greigg; Ronald E. Greigg

[57] ABSTRACT

A bearing construction having an annular clearance provided between the outer surface of a rotary shaft of a rotatable object and the inner wall of a bearing assembly and a fluid feeding means for filling the clearance with a fluid to form a layer of the fluid. A shaft displacement detecting means detects a displacement of the rotary shaft during a rotating action.

1 Claim, 5 Drawing Sheets

BEARING CONSTRUCTION AND VIBRATION DETECTING APPARATUS

BACKGROUND OF THE INVENTION

The present invention relates to a bearing construction for supporting a rotary shaft of a motor and more particularly, to a support mechanism for allowing a rotatable object to rotate smoothly with less friction and thus, to measure any minimal amount of vibration during rotation.

A known support mechanism comprises V-shaped bearing blocks or ball bearing units which are sustained by a coil or inverted springs.

In action, the V-shaped bearing blocks tend to produce a sliding friction thus causing unwanted vibrations. Hence, a rotatable object to be examined is affected by the vibrations during rotating movement and will cause turbulence. As the result, a minimal vibration on the rotatable object can hardly be measured.

Although producing no sliding friction, the ball bearing units also create unwanted vibrations when corresponding to the erratic movement caused by undulation on the surface of a rotary shaft of the rotatable object. Hence, it will be tough to measure a minimal vibration on the rotatable object.

As the bearing blocks or units are supported by the coil or inverted springs, a resonant phenomenon determined by an urging coefficient of the springs and a mass of the bearing units is definitely involved and will discourage accurate measurement of a vibration.

It is thus an object of the present invention to provide a bearing construction capable of supporting a rotatable object without disturbing its inherent vibration and a vibration detecting apparatus for detecting a minimal vibration on the rotatable object.

SUMMARY OF THE INVENTION

For overcoming the foregoing drawbacks, the present invention is directed towards a bearing construction in which an annular clearance is provided between the outer surface of a rotary shaft of a rotatable object and the inner wall of a bearing assembly and filled with a fluid by a fluid feeding means thus forming a layer of the fluid for support of the rotary shaft.

The bearing construction is also accompanied with a shaft displacement detecting means for detecting a vibration on the rotary shaft during a rotating action.

The shaft displacement detecting means may be selected from a pressure detecting means for detecting a change in the pressure of a fluid flow supplied from the fluid feeding means which has an opening to the clearance, an optical sensor for optically detecting a displacement of the rotary shaft, a magnetic sensor for detecting a change in the magnetic resistance across the clearance which results from the displacement of the rotary shaft formed of a magnetic material, another magnetic sensor for detecting a change in the self-induction current of an induction coil mounted on the bearing assembly, which results from the displacement of the rotary shaft formed of a magnetic material, and a static sensor for detecting a change in the static capacitance across the clearance which results from the displacement of the rotary shaft.

Using the bearing construction of the present invention, a friction developed between the outer surface of the rotary shaft of the rotatable object and the inner wall of the bearing assembly will be minimized by the action of the fluid layer.

As the clearance is filled with the fluid, unfavorable effects will hardly be involved even if the shaft and/or bearing has any damage and undulation on the surface.

The displacement of the rotary shaft of the rotatable object running on the bearing assembly will be detected by the shaft displacement detecting means for calculation of a degree of vibration caused by an unbalance error of the rotatable object.

The displacement of the rotary shaft causes a change in the pressure of a fluid flow supplied through the opening of the fluid feeding means to the clearance and will thus be detected through measuring the pressure change with the pressure detecting means.

The displacement of the rotary shaft can also be measured by an optical detecting procedure.

When the rotary shaft is formed of a magnetic material and is displaced across the clearance imposed with a magnetic field, the magnetic resistance of the clearance varies. Hence, the displacement of the rotary shaft will be detected by measuring a change in the magnetic resistance.

Also, the displacement of the rotary shaft formed of a magnetic material causes a change in the self-induction current of the induction coil and will be detected through measuring the current change.

Furthermore, the displacement of the rotary shaft across the clearance causes a change in the static capacitance between the rotary shaft and the bearing assembly and will thus be detected through measuring the static capacitance change.

DETAILED DESCRIPTION OF PREFERRED EMBODIMENTS

Figure 1:
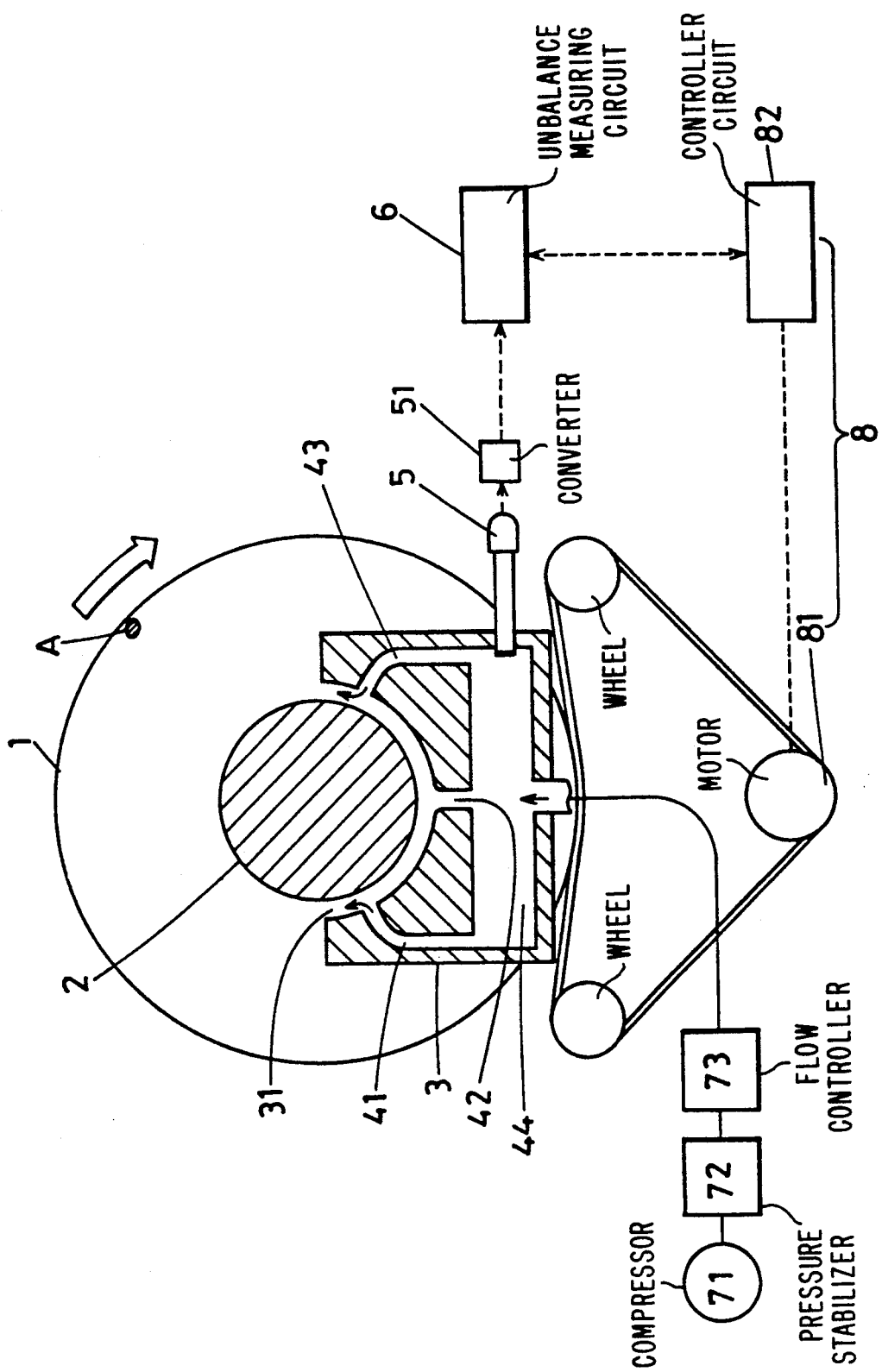
FIG. 1 is a schematic view of the arrangement of a bearing assembly and a vibration detecting means showing one embodiment of the present invention.

An unbalance detecting apparatus containing a rotary shaft support mechanism and an unbalance vibration detector, according to one embodiment of the present invention, will be described referring to the accompanying drawings.

As illustrated, there are provided a rotatable object 1 to be examined for an unbalance error, a rotary shaft 2 of the object 1, and a bearing assembly 3 supporting the rotary shaft 2 and serving as a rotary shaft support mechanism. The bearing 3 has a groove 31 therein which is shaped semi-circular in cross section and slightly greater in the diameter than the rotary shaft 2.

Three air passages 41,42,43 are arranged open at one end on the wall of the groove 31 and communicating at the other end to an air reservoir 44. The opening of the air passage 42 is located at the bottom of the groove 31 so as to be just beneath the rotary shaft 2. The two other openings of the air passages 41 and 43 are disposed symmetrical about the air passage 42.

Also, a pressure detector 5 is provided for measuring a change in the pneumatic pressure of the air reservoir 44 and feeding its corresponding signal through a converter 51 having a built-in amplifier to an unbalance measuring circuit 6.

An amount of compressed air to be supplied to the air reservoir 44 is produced by a compressor 71, stabilized in pressure by a pressure stabilizer 72, and controlled by a flow controller 73 to a specific flow of supply required for slightly lifting the rotary shaft 2.

A driving system 8 for rotating the object 1, which is provided with a driving motor 81 controlled for actuation by a controller circuit 82.

In action, the driving system 8 when receiving a signal from the controller circuit 82 actuates the object 1 to rotate at a high speed required for measuring a degree of unbalance error and upon detection of an unbalance point, decelerates rotation of the object while measuring a phase data of any unbalance point before stopping the unbalance point at a desired angle. For this purpose, the driving motor 81 is preferably a stepping or servo motor.

A procedure of the measuring action of the unbalance detecting apparatus of the present invention starts with setting of the object 1 onto the bearing assembly 3. The rotary shaft 2 of the object 1 is lifted up by a flow of air supplied through the three air passages 41,42,43 and then, the object 1 is driven by the driving system 8 for rotation at a speed of as high as more than several hundreds of revolutions per minute The opening of each air passage is as small as about 0.5 mm in diameter for ease of detecting a pressure change.

The rotary shaft 2 vibrates as the unbalance point denoted by the letter A is turned at high speed. When the angular position of the unbalance point A becomes in alignment with the opening of any air passage, the rotary shaft 2 is radially displaced by a centrifugal force developed on the point A so as to decrease its distance from the wall of the groove 41. Accordingly, the resistance against the outward flow of air is increased thus causing the pressure in the air passage to rise up.

The increase of pressure is detected by the pressure detector 5 in the air reservoir 44 and translated to a degree of upward and downward or vertical oscillation of the rotating object 1. A resultant unbalance signal of the pressure detector 5 is analyzed with the unbalance measuring circuit 6 to calculate a phase data of the unbalance point and a magnitude of the unbalance error on the object 1.

However, horizontal displacement of the unbalance point A or the rotary shaft 2 causes two opposite pressure changes of their respective air passages 41,43 to offset each other while the pressure in the air passage 42 remains unchanged. Hence, no pressure change is involved in the air reservoir 44.

The vertical or upward and downward oscillation of the unbalance point A causes a change in the pressure of the outward flow of air from the air passage 42 which in turn varies the pressure in the air reservoir 44.

The vertical oscillation of the rotary shaft 2 is detected by the pressure detector 5 and its signal is transmitted through the converter 51 to the unbalance measuring circuit 6 where a phase data of the unbalance point A and a magnitude of the unbalance error are calculated from the signal.

In the embodiment shown in FIG. 1, the bearing assembly 3 has a bearing construction and a shaft displacement detecting means arranged integral with each other.

The advantages of the unbalance detecting apparatus of the embodiment will now be explained.

The rotary shaft 2 is sustained on a thin layer of air and can thus rotate with a considerable lower rate of friction.

Also, unwanted vibration resulting from undulation and roughness on both the surface of the rotary shaft 2 and the wall of the groove 31 of the bearing assembly 3 can largely be absorbed by the layer of air, thus affecting by minimum degrees on the oscillation caused by the unbalance error of As the oscillation of the object 1 is minimumally affected, it can successfully be measured and converted into an unbalance signal when the object 1 being rotated at a lower speed.

As the measurement of an unbalance error is executed during the lower speed rotation, the object 1 can be stopped at a higher accuracy and within a shorter duration for desired positioning after the measurement.

Also, as the measurement of unbalance error is carried out during the rotation at a lower speed, a repeat action for checking that the unbalance error is eliminated can be executed just after application of an amount of balance-weight paste which remains not completely cured. Accordingly, the overall unbalance error detecting and correcting procedure will be executed at higher efficiency.

Figure 2:
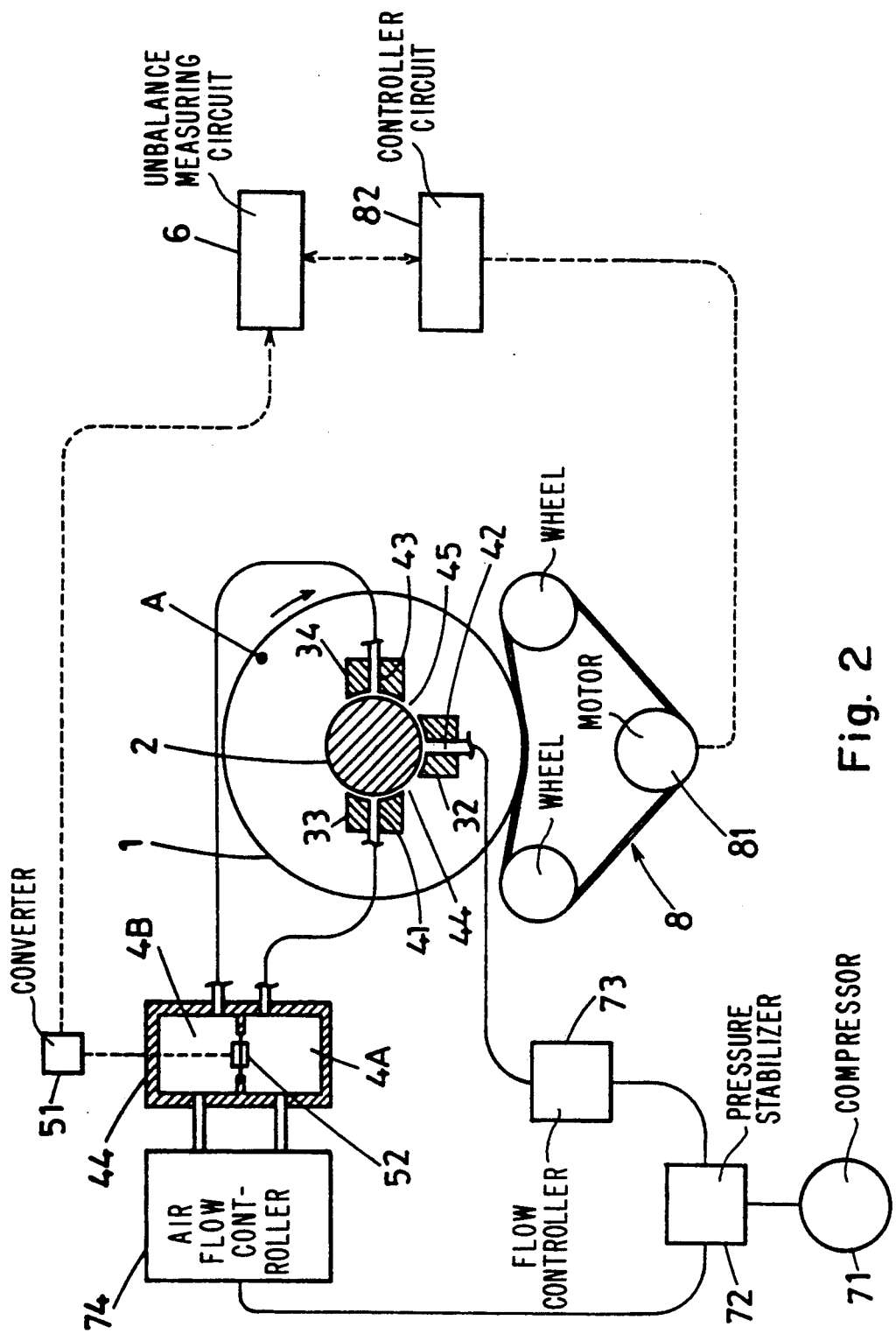
FIG. 2 is a schematic view of the arrangement of a bearing assembly and a vibration detecting means showing another embodiment of the present invention.

FIG. 2 shows another embodiment of the present invention in which a bearing construction which acts as a supporting means for supporting the load of a rotatable object is arranged separately of the shaft displacement detecting means.

As shown, a bearing unit 32 for supporting the load of a rotatable object 1 has an air passage 42 therein. Also, two shaft displacement detecting means or air blower units 33,34 are provided having air passages 41,43 therein respectively for supply of pressured air. The bearing unit 32 is spaced by distances 44,45 from the air blower units 33,34 respectively so that the flow of air from its air passage 42 can rarely affect the pneumatic pressure in the air passages 41,43. More particularly, the flow of air from the air passage 42 is passed between the rotary shaft 2 and the bearing unit 32 and discharged to the clearances 44,45 while the pressure in the air passages 41,43 of their respective air blower units 33,34 remain unaffected.

The flow of air to be supplied through the air passage 42 is controlled by a flow controller 73 to a specific rate needed for lifting up the rotary shaft 2 slightly from the bearing unit 32 during rotation.

Also, the flow of air to be supplied through the air passages 41,43 is controlled by another flow controller 74 to a predetermined rate and then, supplied into an air reservoir 44 which has a couple of air chambers 4A and 4B.

When the rotary shaft 2 is displaced to the left by the action of an unbalance point A of the rotating object 1, its clearance from the air blower unit 33 becomes smaller and the pressure of the air flow in air passage 41 of the air blower unit 33 is increased. Hence, the pressure in the air chamber 4A rises up. Simultaneously, its clearance from the air blower unit 34 becomes greater causing the pneumatic pressure in the air passage 43 and thus, in the air chamber 4B to be lowered.

As the two air chambers 4A,4B in the air reservoir 44 are increased and decreased in the pressure respectively, a resultant pressure difference causes a diaphragm mounted to a partition therebetween to deflect. The deflection of the diaphragm is then detected by a distortion gage 52 which is consisted mainly of a piezoelectric sensor and resistors and directly mounted to the diaphragm, and measured as a correct value of the pressure difference in the air reservoir 44.

A resultant pressure difference signal of the distortion gage 52 is transferred through a converter 51 having a built-in amplifier to an unbalance measuring circuit 6 which in turn calculates a phase data of the unbalance point A and a magnitude of the unbalance error from the signal.

The unbalance point A can be stopped at any desired position through controlling a driving system 8 by the phase data fed through a controller circuit 82.

As described above, accuracy in the measurement is increased because a pressure change in the air reservoir 44 caused by the horizontal oscillation of the rotary shaft 2 is detected as the pressure difference between the two chambers 4A,4B. The same effect will be given by detecting the two pressures of their respective air passages 41,43 and amplifying them with a differential amplifier for ease of comparison.

Also, the pressure change detecting means may be replaced with a pair of means for detecting the velocity of an air flow. The two air velocity detecting means are preferably disposed within or adjacent to the air blower unit 33,34 for higher accuracy and quicker response.

A change in the clearance between the rotary shaft 2 and the bearing unit 42 can be measured with a magnetic, electric, or optical detecting means.

Figure 3:
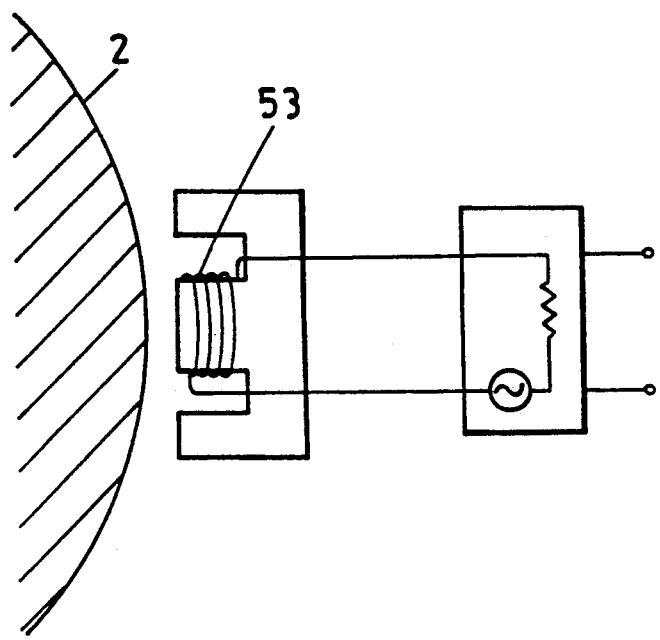
FIG. 3 is a schematic view of a modification of the shaft displacement detecting means according to the present invention.
Figure 4:
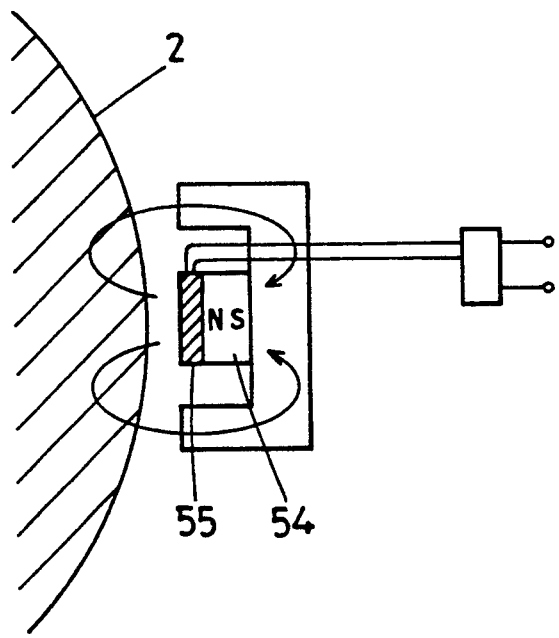
FIG. 4 is a schematic view of another modification of the shaft displacement detecting means according to the present invention.

More specifically, the magnetic detecting means may be arranged in which a change in the magnetic flux strength resulting from the clearance change is detected with an induction coil 53 which is excited by a low frequency voltage to convert the magnetic change into a change in the current, as shown in FIG. 3. Also, the magnetic detecting means may be a magnetic sensor 55 which detects a resultant change in the magnetic flux strength of a magnet 54, as shown in FIG. 4.

Figure 5:
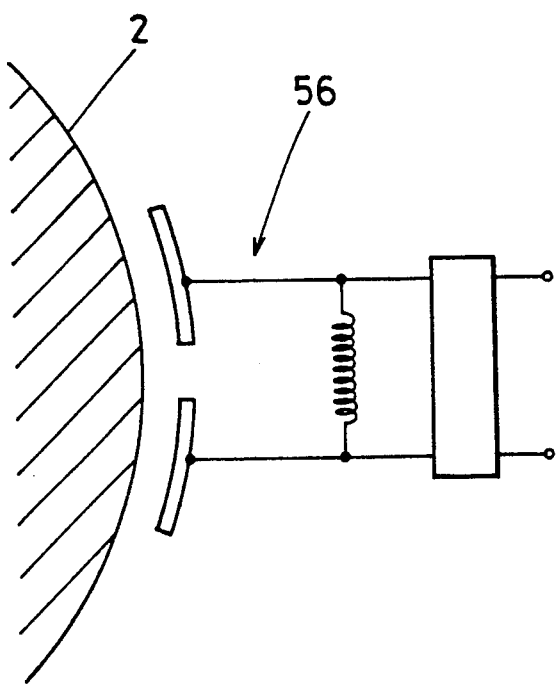
FIG. 5 is a schematic view of a further modification of the shaft displacement detecting means according to the present invention.
Figure 6:
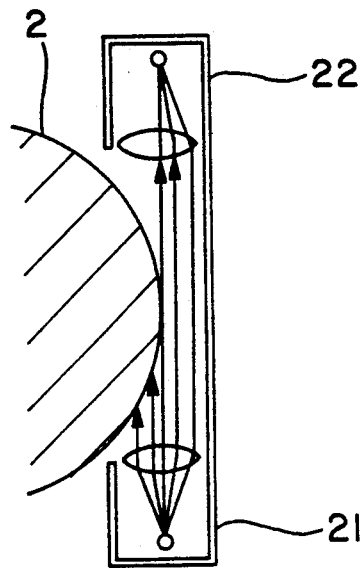
FIGS. 6, 7 and 8 show three examples of possible orientations for the photo-optical transmitter and sensor with relationship to a rotary shaft.

The electric detecting means may be a resonant circuit 56, shown in FIG. 5, in which the clearance change is converted into a change in the static capacitance.

As shown in FIG. 56, a part of light generated from a photogenic component 21 is screened by a shaft 2 and the other part of the light reaches a photo receiving component 22. As an amount of the screened light is changeable according to an amount of vibration of the shaft 2, a vibration of the shaft 2 can be detected at the photo receiving component 22.

Figure 7:
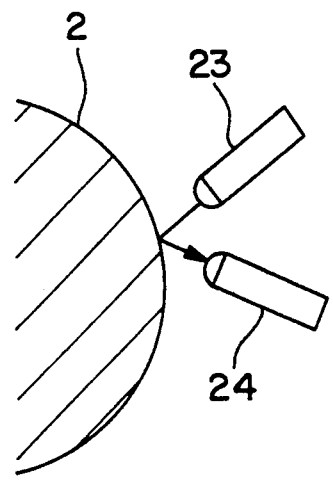

As shown in FIG. 7, light which is generated from a photogenic component 23 is reflected at a surface of a shaft 2 and reaches a photo receiving component 24. As a distance between the photogenic component 23 and the shaft 2 is changeable according to an amount of vibration of the shaft 2, an amount of light which reaches the photo receiving component 24 changes according to a difference o the distance, and thus so too will be the electrical signal generated therefrom.

Figure 8:
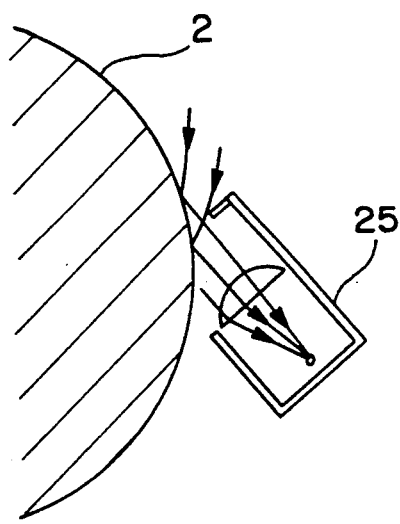

In FIG. 8, a photo receiving component 25 detects a part of light which passes through a clearance around a shaft 2. As the clearance changes with shaft vibration, the electrical signal generated would vary to record the presence of such vibration.

The optical detecting means may be an optical sensor in which a change in the light amount across the clearance or reflected light is detected as the clearance change.

In any case, the rotatable object 1 to be examined is supported by the rotary shaft support mechanism of the present invention having a fluid layer arrangement. Although the layer of air is used for no-contact support of the rotary shaft 2 on the bearing assembly or unit, other fluids will be employed with equal success.

The foregoing relates to a preferred exemplary embodiment of the invention, it being understood that other variants and embodiments thereof are possible within the spirit and scope of the invention, the latter being defined by the appended claims.

What is claimed is:

1. A vibration detecting apparatus comprising:
   a bearing construction having an annular clearance provided between an outer surface of a rotary shaft of a rotatable object and an inner wall of a bearing assembly and a fluid feeding means for filling the clearance with a fluid to form a layer of the fluid; and
   a shaft displacement detecting means for detecting a displacement of the rotary shaft during a rotating action and for converting an amount of the displacement to an electrical signal, wherein said shaft displacement detecting means comprises a pressure detecting means or detecting a change in a pressure of fluid flow supplied from the fluid feeding means which has an opening to the clearance, and an unbalance measuring circuit for calculating the shaft displacement based upon the change in pressure detected by the pressure detecting means.

* * * * *